United States Patent [19]
Sakai et al.

[11] Patent Number: 5,222,160
[45] Date of Patent: Jun. 22, 1993

[54] DOCUMENT REVISING SYSTEM FOR USE WITH DOCUMENT READING AND TRANSLATING SYSTEM

[75] Inventors: Rieko Sakai, Zama; Naoko Kitajima, Kawasaki; Chieko Oshima, Yaizu, all of Japan

[73] Assignee: Fujitsu Limited, Kawasaki, Japan

[21] Appl. No.: 635,077

[22] Filed: Dec. 28, 1990

[30] Foreign Application Priority Data

Dec. 28, 1989 [JP] Japan .................................. 1-342465

[51] Int. Cl.$^5$ .......................... G06K 9/03; G06K 9/00; G09G 1/06; G06F 15/38
[52] U.S. Cl. .......................................... 382/57; 382/1; 382/61; 364/419; 340/723
[58] Field of Search ....................... 382/1, 9, 57, 61, 10, 382/13, 48; 364/419; 340/723

[56] References Cited

U.S. PATENT DOCUMENTS

| | | | |
|---|---|---|---|
| 4,599,612 | 7/1986 | Kaji et al. | 340/723 |
| 4,685,060 | 8/1987 | Yamano et al. | 364/419 |
| 4,890,230 | 12/1989 | Tanoshima et al. | 364/419 |
| 4,916,614 | 4/1990 | Kaji et al. | 364/419 |
| 5,022,081 | 6/1991 | Hirose et al. | 364/419 |

FOREIGN PATENT DOCUMENTS

| | | |
|---|---|---|
| 265280 | 4/1988 | European Pat. Off. |
| 59-206985 | 11/1984 | Japan |
| 63-143684 | 6/1988 | Japan |
| 2-121055 | 5/1990 | Japan |
| 2-211580 | 8/1990 | Japan |

*Primary Examiner*—David K. Moore
*Assistant Examiner*—Michael Cammarata
*Attorney, Agent, or Firm*—Staas & Halsey

[57] ABSTRACT

An image-to-character-position-correspondence-table producing unit produces image-to-character-position-correspondence-table composed of a set comprising an-image-of-a-document, a character-recognized document and a translated document. A candidate character producing unit produces candidate characters for revising misrecognized characters. A Japanese-document-to-translated-document correspondence table stores a correspondence relationship between an original Japanese document and a translated document in the form of a table. When misrecognized characters are being revised, the image-to-character-position-correspondence-table is displayed by the image-to-character-position-correspondence-table. A revising unit prompts a user to specify a misrecognized portion in the translated document of the image to character-position-correspondence-table. Next, the revising unit refers to the Japanese-document-to-translated-document correspondence table to extract a portion of each of the-image-of-the-document and the recognized document that corresponds to the specified portion and causes the image-to-character-position-correspondence-table producing unit to display the corresponding portions. Subsequently, the revising unit refers to the candidate character producing unit to extract candidate characters as requested by the user and causes the image-to-character-position-correspondence-table producing unit to display these candidate characters. Candidate characters are selected by the user. The misrecognized portion in the recognized document is replaced with the selected candidate characters, a new character-recognized document is translated and a newly translated document is displayed. In this way even foreigners who have little knowledge of Japanese can carry out revision work on misrecognized characters with ease.

12 Claims, 6 Drawing Sheets

FIG. 7A

その 技術文 は 滑稽な 発想 を 持った・・・
その 技術文 は 滑稽な 発想 を 持った・・・
The branch art sentence may have...
⋮

FIG. 7B

その 技術文 は 滑稽な 発想 を 持った・・・
その 技術文 は 滑稽な 発想 を 持った・・・
The branch art sentence may have...
⋮

その 技術文 は 滑稽な 発想 を 持った・・・
その 技術文 は 滑稽な 発想 を 持った・・・
The technological sentence may have ...
⋮

DOCUMENT REVISING SYSTEM FOR USE WITH DOCUMENT READING AND TRANSLATING SYSTEM

BACKGROUND OF THE INVENTION

1. Field of the Invention

The present invention relates to a document-revising apparatus for use with a document reading and translating system and, more particularly, to a revised document display apparatus for use with a Japanese-document reading and translating system which is used with a combined system comprising a Japanese document reader adapted for entering a Japanese document as an image and character recognition thereof and an automatic translator, permitting even foreigners who understand little Japanese to revise misread characters with ease.

2. Description of the Related Art

With recent internationalization, it has become increasingly necessary for Japanese documents to be read in various countries. Thus, a combined system comprising a Japanese document reader which serves as Japanese entry means and an automatic translator which translates Japanese into a foreign language has been developed.

FIG. 1 is a block diagram of a conventional Japanese document reader. This prior art consists of an image entry unit 1, an-image-of-a-document storage unit (image memory) 2, a character segmentation unit 3, a character recognition unit 4, a Japanese document storage unit 5, a revising or correcting unit 6 and a display unit 7.

A Japanese document is read as an image-of-a-document by an OCR (optical character reader) of the image entry unit 1 and the-image-of-the-document is then stored in the-image-of-the-document storage unit 2.

Next, the character segmentation unit 3 reads the image of the document from the-image-of-the-document storage unit 2 and segregates characters from the image of the document in sequence. The character recognition unit 4 performs a character recognition process on each of the character segmentations. Data on each of recognized characters is stored in the Japanese document storage unit 5. The display unit 7 displays the Japanese document subjected to the recognition process which has been stored in the Japanese document storage unit 5.

The character recognition rate of the character recognition unit 4 cannot be 100%. Therefore, it is necessary to revise a document that has been partly misrecognized. The user compares the character-recognized document displayed by the display unit 7, with the original document (namely, the document written or printed on a sheet of paper) to search for misrecognized characters. If he finds any, he revises them by using the revising unit 6. For example, the revising work may be performed by deleting a misrecognized character, entering the Japanese rendering or reading (kana: Japanese syllabry) of an image character corresponding to the misrecognized character, performing kana-to-kanji (Chinese character) conversion on the kana to obtain a correct character, and again storing the obtained character data in the Japanese document storage unit 5.

FIG. 2 is a block diagram of a conventional automatic translator comprising a data entry unit 8, a translating unit 9, a translated document storage unit 10 and a display unit 7'.

Japanese-document data entered via the data entry unit 8 is read into the translating unit 9 for translation into a language (for example, English) other than Japanese. The translated document is stored in the translated document storage unit 10 and displayed on the display unit 7' as needed.

The Japanese-document reader of FIG. 1 and the automatic translator of FIG. 2 constitute separate systems. Since such separate systems have poor operability, it has been proposed to integrate them. FIG. 3 is a block diagram of a conventional integrated Japanese-document reading and translating system. In FIG. 3, like reference characters are used to designate blocks corresponding to those in FIGS. 1 and 2.

In the system of FIG. 3, first, a Japanese document is stored in the Japanese document storage unit 5 via the image entry unit 1, the-image-of-the-document storage unit 2, the character segmentation unit 3 and the character recognition unit 4, and is revised by the revision unit 6 while it is being displayed on the display unit 7.

Next, the correct Japanese document stored in the Japanese document storage unit 5 is entered directly into the translating unit 9 for translation into a foreign language, as in the translating unit 9 of FIG. 2. The obtained foreign language document is then stored in the translated document storage unit 10 and displayed by the display unit 7 as needed. That is, the display unit 7 also serves as the display unit 7' of FIG. 2.

In this way the Japanese-document reading and translating system of FIG. 3 can perform a combined process of reading a Japanese document written or printed on a sheet of paper and translating it to a foreign language.

However, the conventional system of FIG. 3 has the following problems.

First, the user has to compare a displayed document with an original Japanese document prior to image entry (a document written or printed on a sheet of paper) with his eyes in order to search for and revise misrecognized characters. Thus, it is very difficult for a foreigner (a non-Japanese) whose knowledge of Japanese is poor to be sure of correctly revising the results of recognition.

Second, since it is difficult to be sure that the recognition results have been correctly revised, subsequent translation work may not be executed correctly.

As described above, heretofore, a system combining a Japanese-document reader and an automatic translator which is easy for foreigners to operate has not yet been constructed.

SUMMARY OF THE INVENTION

It is therefore an object of the present invention to provide a system combining a Japanese-document reader and an automatic translator which permits even persons whose knowledge of Japanese is poor to search for and revise misrecognized characters in a short time and without any difficulty.

The present invention provides a document revising apparatus for use with a document reading and translating system for performing character recognition of an-image-of-a-document to make a recognized document and translating the recognized document, comprising: character recognition means for entering a document written in a first language as an image of a document, segregating characters from said image of the document and performing character recognition on each character segmentation to produce a recognized document; translating means for translating said document in said first language to a second language to make a translated document; correspondence table producing and displaying means for producing and displaying an image-to-character-position-correspondence-table in which a correspondence is established between said image document, said recognized document and said translated document; original document-to-translated-document correspondence relationship storing means for storing a correspondence relationship between an original document and a translated document; candidate character producing means for producing candidate characters used for revising misrecognized characters; and document revising means for carrying out the following processes: a first process allowing a user to specify a misrecognized portion in said translated document displayed by said correspondence table producing and displaying means; a second process referring to said original-document-to-translated-document correspondence relationship storing means to extract portions of said image document and said recognized document which correspond to said misrecognized portion specified and causing said correspondence table producing and displaying means to display said portions extracted explicitly; a third process referring to said candidate character producing means to extract candidate characters for said misrecognized portion in said recognized document and causing said correspondence table producing and displaying means to display said candidate characters as requested by the user; a fourth process enabling the user to select arbitrary characters from said candidate characters displayed and replacing said misrecognized portion in said recognized document with selected candidate characters; a fifth process causing said translating means to translate a new document in which said misrecognized portion is replaced with said selected candidate characters to thereby produce a new translated document and causing said correspondence table producing and displaying means to display said new translated document; and a control process for repeating said first through said fifth processes.

According to the configuration of the present invention, the user can search for misrecognized characters on the basis of the translation result, not on the basis of the character recognition result of the document reader. Thus, even foreigners who have little knowledge of the original language can carry out the revising work without any difficulty.

The work of revising the recognized document can be carried out not by kana-to-kanji conversion using keyboard entry, but by selecting a correct character from displayed candidate characters on the basis of visual matching with the image-of-the-document. Thus, even persons who have little knowledge of the original language can carry out the revising work with ease.

BRIEF DESCRIPTION OF THE DRAWINGS

Further objects and advantages of the present invention will be apparent from the following description of a preferred embodiment with reference to the accompanying drawings, in which:

FIG. 7 is a diagram illustrating an example of an image-to-character-position-correspondence-table of the present invention.

DESCRIPTION OF THE PREFERRED EMBODIMENTS

Figure 1:
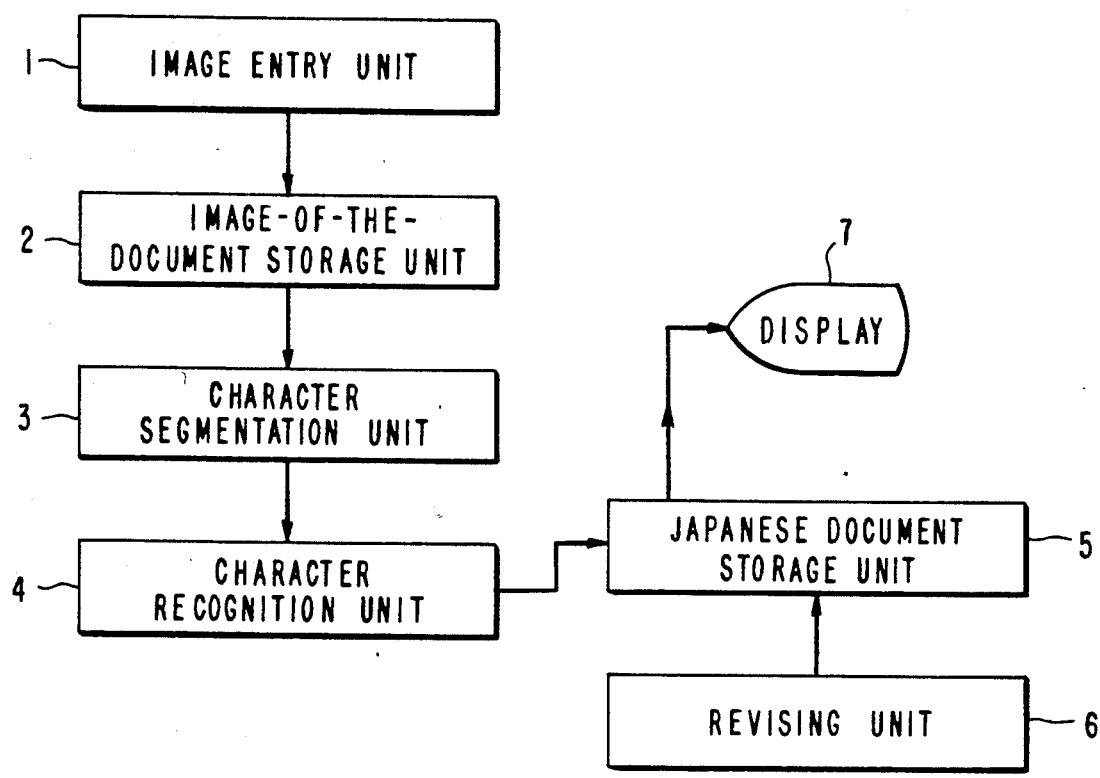
FIG. 1 is a block diagram of a conventional Japanese document reader.
Figure 2:
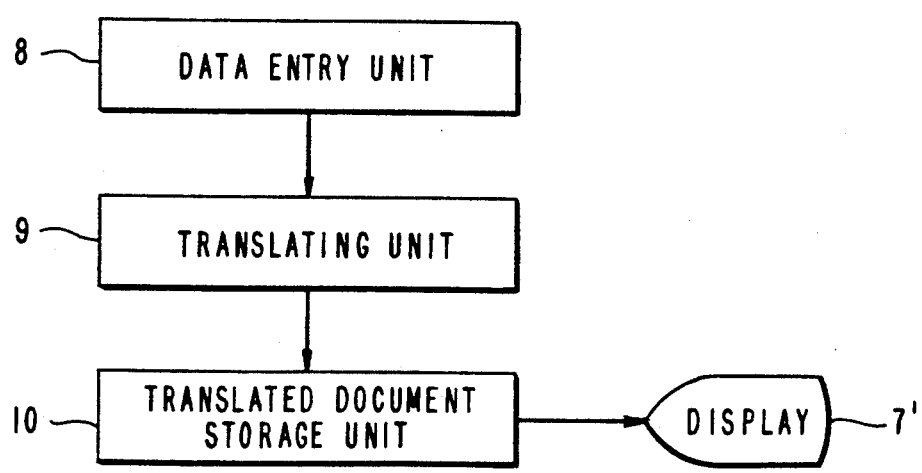
FIG. 2 is a block diagram of a conventional automatic translator.
Figure 3:
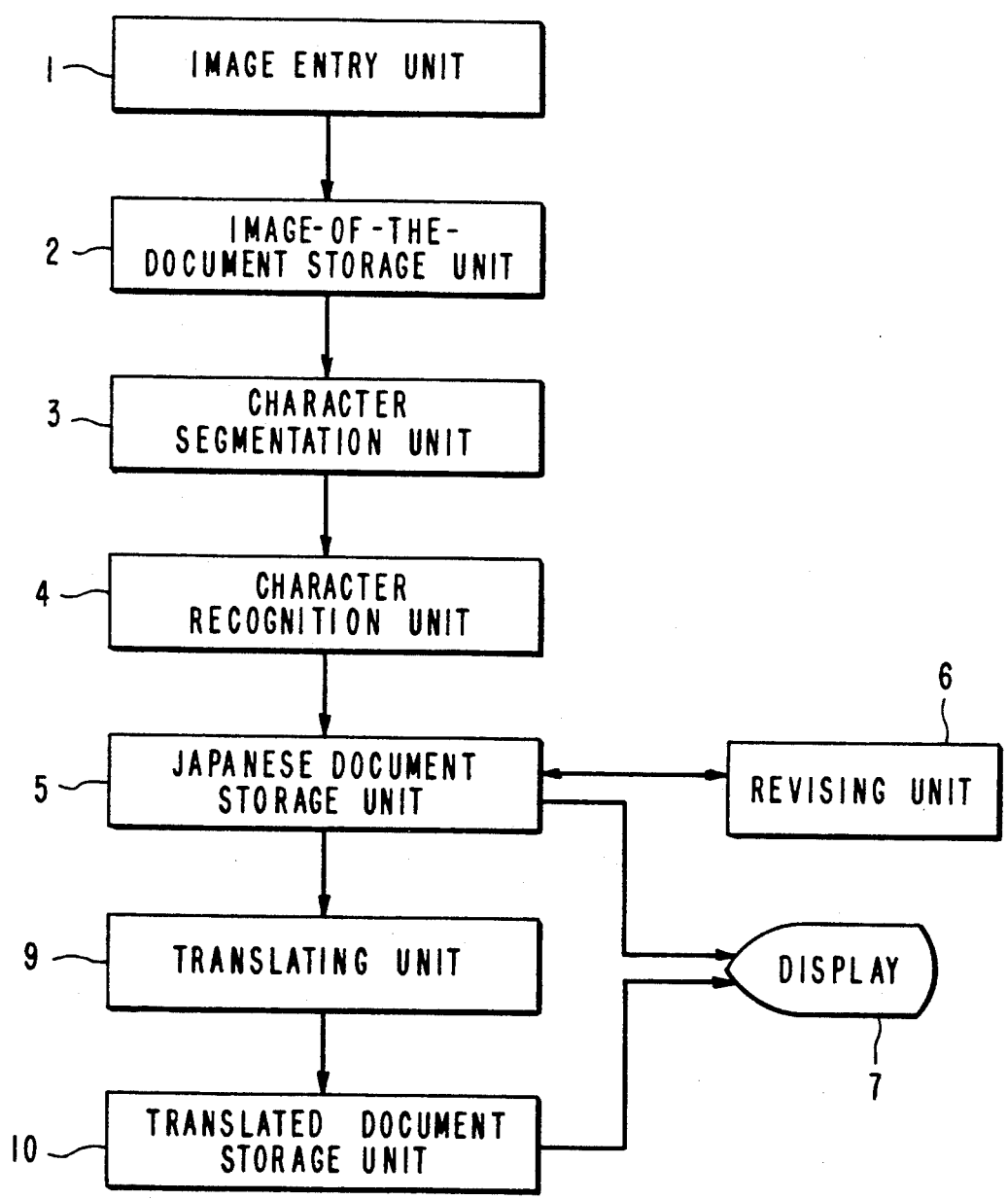
FIG. 3 is a block diagram of a conventional combined Japanese document reading and translating system.
Figure 4:
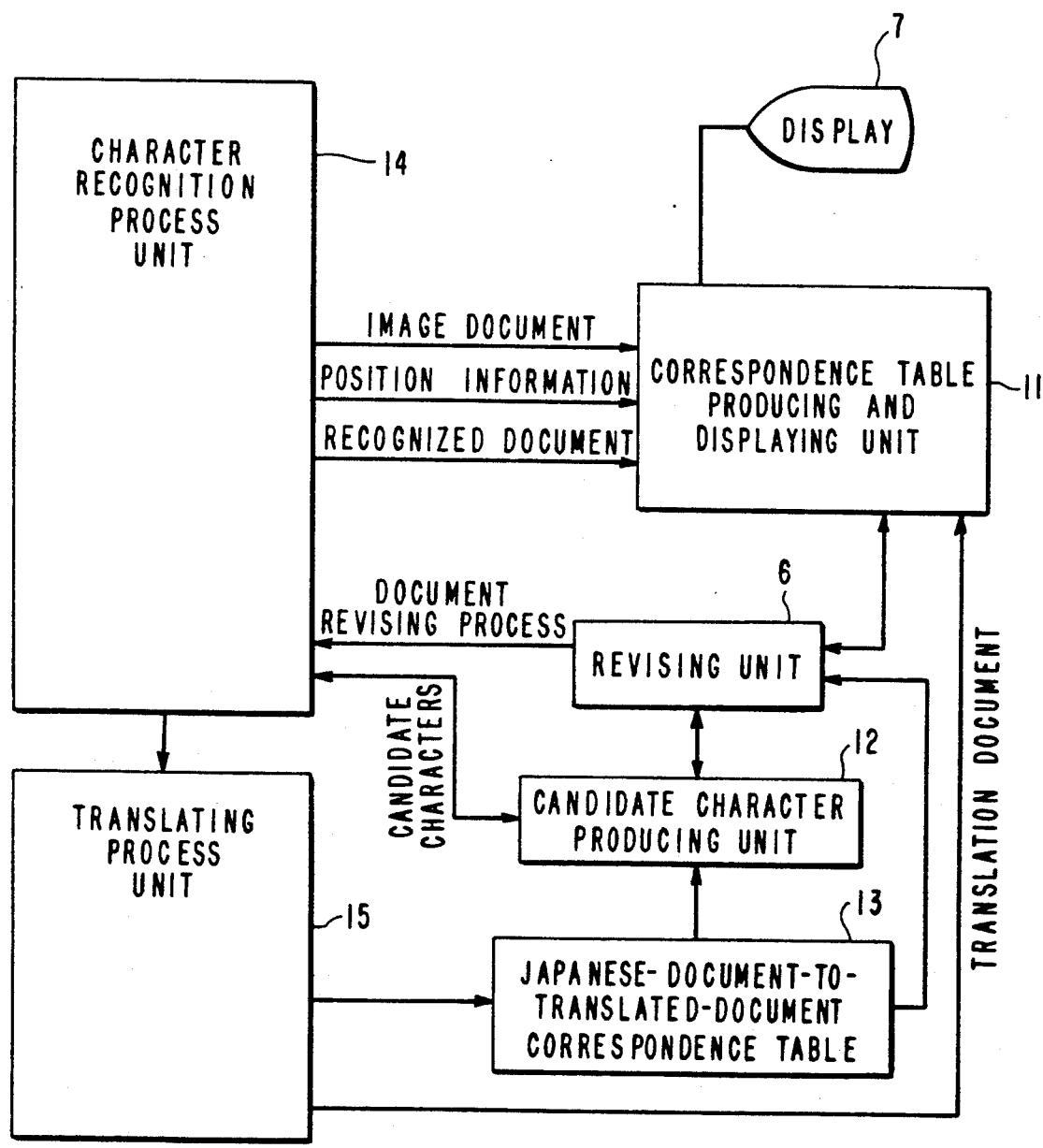
FIG. 4 is a basic block diagram of a Japanese document reading and translating system embodying the present invention.

FIG. 4 is a basic block diagram of a Japanese document reading and translating system embodying the present invention. In FIG. 4, like reference numerals are used to designate blocks corresponding to those in FIG. 3.

The embodiment of the present invention includes a character recognition process unit 14 for segregating characters from an entered image document and performing character recognition on character segmentations, a translating process unit 15 for translating a document which has been subjected to the recognition process to a foreign language , a display unit 7 for displaying a document and a revising unit 6 for revising misrecognized characters in the recognized Japanese document. These units have the same functions as those in FIG. 3.

In addition to the above configuration, the present embodiment contains the following distinctive units. First, an correspondence table producing and displaying unit 11 is provided. This unit produces a set of documents comprising an-image-of-a-document, a recognized document and a translated document. Second, a candidate character producing unit 12 is provided which makes candidate characters for backing up the revision of misrecognized characters. Third, a Japanese-document-to-translated-document correspondence table 13 is provided, which stores the correspondence between a Japanese document before translation and a translated document in the form of a table. In the basic configuration described above, the image-to-character-position-correspondence-table produced by the correspondence table producing and displaying unit 11 is displayed by the display unit 7 so that the misrecognized characters can be revised.

When the user specifies a misrecognized portion on the translated document of the image-to-character-position-correspondence-table displayed on the display unit 7 by using the revising unit 6, the revising unit 6 refers to the Japanese document-to translated-document correspondence table 13 to extract from the image of the document and the recognized document portions corresponding to the specified portion and informs the image -to-character-position-correspondence-table producing unit 11 of information about the corresponding portions. The portion of the translated document specified by the user and the corresponding portions of the image-of-the-document and the recognized document are thereby displayed explicitly on the display unit 7. That is, these portions are, for example, blinked or reversed on the display unit.

Subsequently, when prompted by the user, the revising unit 6 refers to the candidate character producing unit 12 to extract candidate characters for the misrecognized portion in the recognized document and informs the correspondence table producing and displaying unit 11 of the candidate characters. The candidate characters are thereby displayed on the display unit 7.

When the user selects arbitrary characters from the candidate characters displayed by the display unit 7 by using the function of the revising unit 6, the misrecognized portion in the recognized document displayed by the display unit 7 is replaced with the selected candidate characters and the document revision information is transmitted to the character recognition process unit 14. The character recognition process unit 14 replaces the misrecognized portion in the recognized document with the selected candidate characters to prepare a new recognized document which is stored again, and sends the new document to the translating process unit 15. The translating process unit 15 retranslates the portions corresponding to the selected candidate characters and sends a new translation document to the correspondence table producing and displaying unit 11 for display on the display unit 7.

Figure 5:
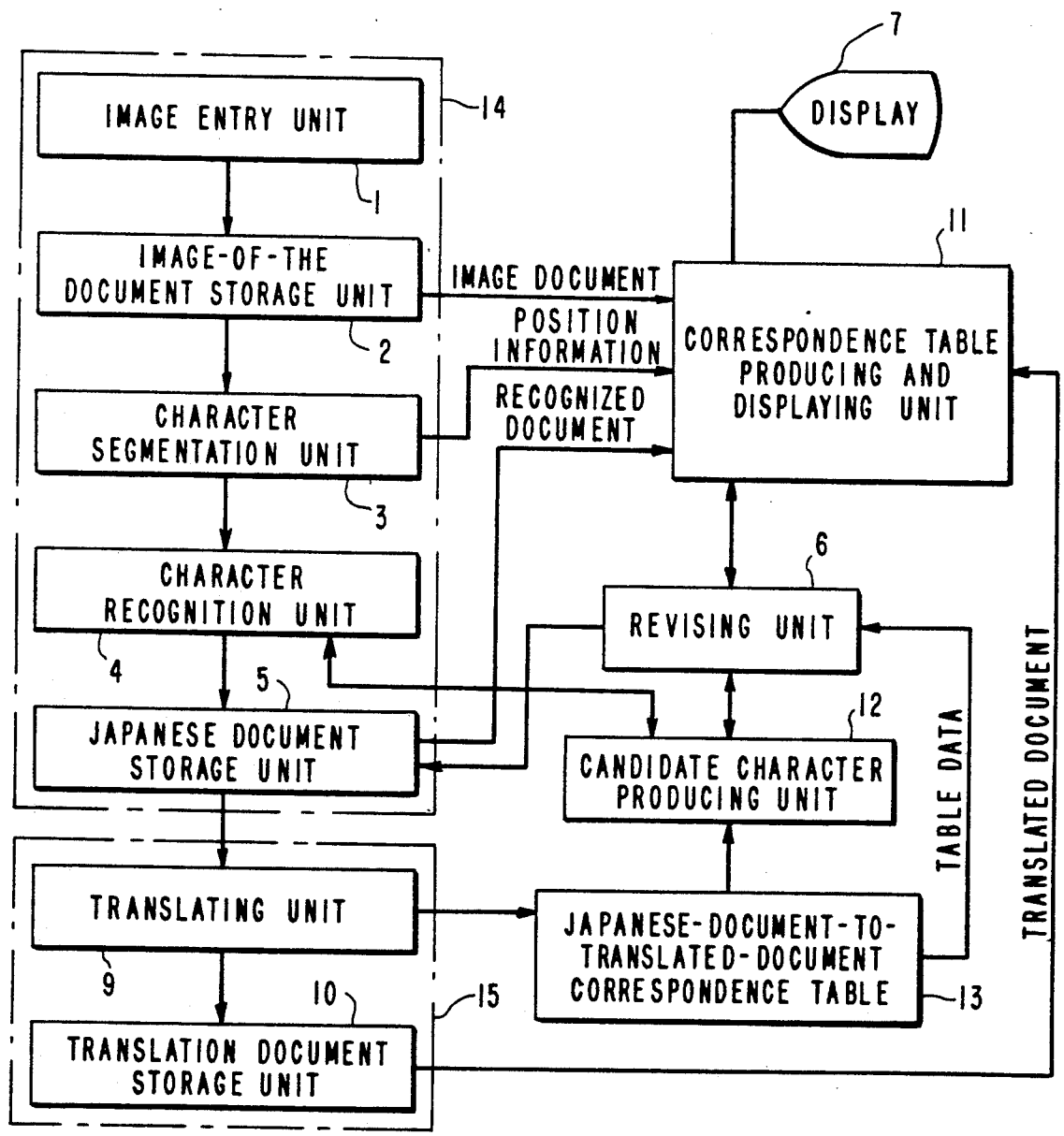
FIG. 5 is a detailed block diagram of the system of FIG. 4.
Figure 6:
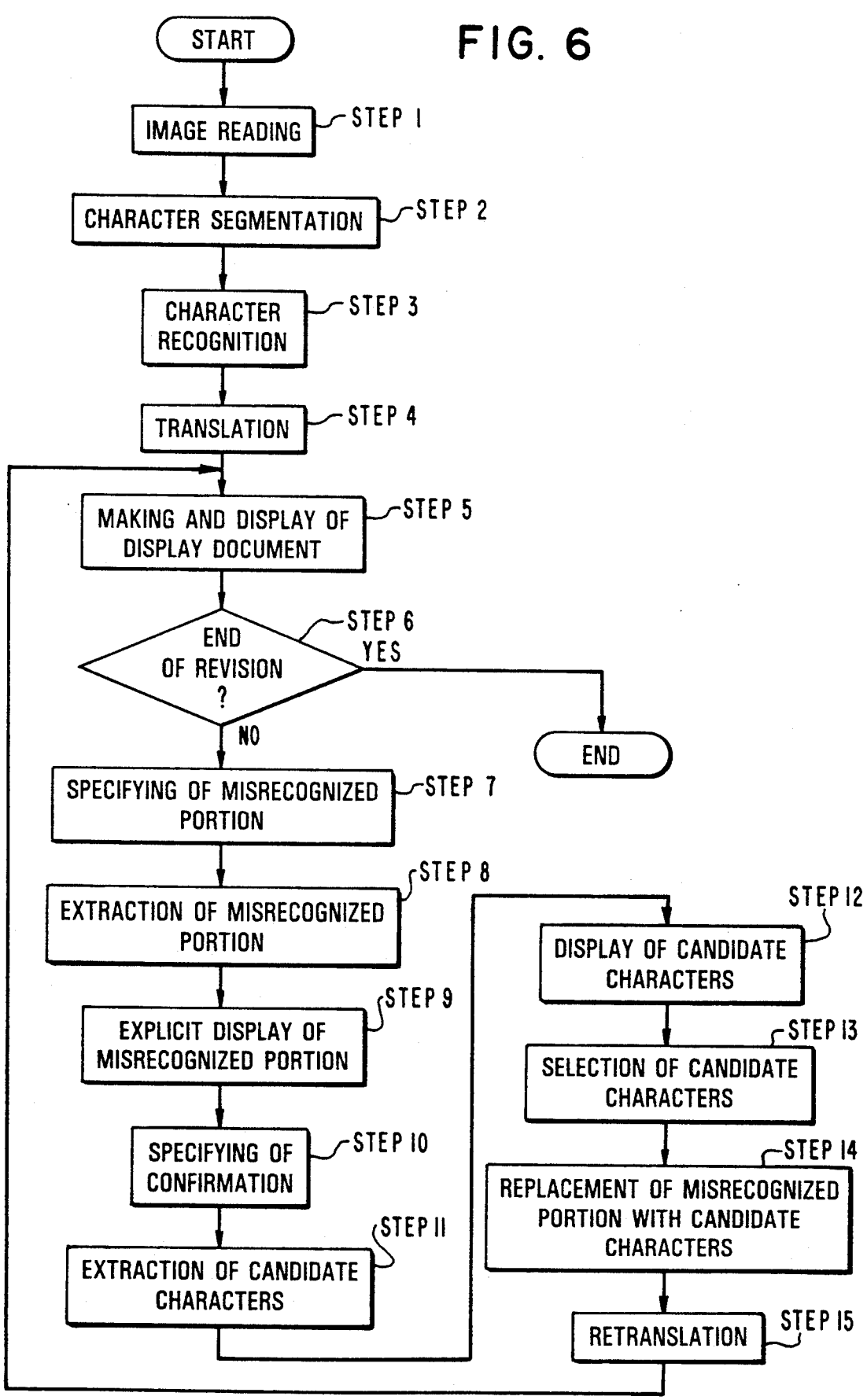
FIG. 6 is a flowchart for explaining the operation of the present invention.

FIG. 5 illustrates more specifically the configuration of the system of FIG. 4. FIG. 6 is a flowchart of the operation of the system of FIG. 5 and FIG. 7 illustrates an example of a displayed document. In FIG. 5, like reference numerals are used to designate blocks corresponding to those in FIGS. 3 and 4.

In the configuration of FIG. 5, which is based on the configuration of FIG. 4, the character recognition process unit 14 consists of an image entry unit 1, an image-of-a-document storage unit 2, a character segmentation unit 3, a character recognition unit 4 and a Japanese-document storage unit 5. The translating process unit 15 is comprised of a translating unit 9 and a translation document storage unit 10.

The Japanese-document to-translated-document correspondence table 13 stores a set comprising a recognized document (in Japanese) and a corresponding translated document (translated to English, for example) in the form of a table in character-recognition units (for example, on a clause-by clause basis).

The candidate character producing unit 12 extracts characters from the character recognition unit 4 to prepare a table of candidate characters for misrecognized characters.

The operation of the system of FIG. 5 will be described specifically with reference to FIGS. 6 and 7. In the following description, steps 1 through 15 correspond to steps 1 through 15 of the flowchart of FIG. 6.

First, a Japanese document, such as a technological treatise, written or printed on a sheet of paper is read as an image-of-a-document by the image entry unit 1 and the image-of-a-document is stored in the image-of-a-document storage unit 2 (step 1). Next, the character segmentation unit 3 segregates characters from the-image-of-a-document read from the image-of-a-document storage unit 2 (step 2). The character recognition unit 4 performs character recognition on each of the segregated characters and stores the recognized Japanese document in the Japanese-document storage unit 5 (step 3). Subsequently, the character-recognized document is read into the translating unit 9 for translation into a foreign language ( non-Japanese) and the resulting translated document (a translation from Japanese) is stored in the translated document storage unit 10 (step 4).

When the misrecognized characters are being revised, the correspondence table producing and displaying unit 11 prepares an image-to-character-position-correspondence-table containing a set comprising the image-of-the-document, the recognized document and the translated document. The correspondence table producing and displaying unit 11 then reads the-image-of-the-document from the image-of-a-document storage unit 2, the recognized document from the Japanese-document storage unit 5 and the translated document from the translated document storage unit 10 on the basis of position information from the character segmentation unit 3, thereby producing the image-to-character-position-correspondence-table (step 5). The image-to-character-position-correspondence-table prepared in this way is displayed on the display unit 7 (step 5).

FIG. 7A illustrates one example of a displayed image (an image-to-character position-correspondence-table) on the screen of the display unit 7. In this example, the first line indicates an image-of-a-document, the second line indicates a recognized document and the third line indicates a translated document. The image-of-the-document and the character-recognized document are each separated into, for example, clauses and the clauses of both documents are displayed in one-to-one correspondence.

The user carries out revising work while watching the display screen. In this case, the user searches the translated document for portions that do not seem to make sense and specifies those portions by using a device (for example, a mouse input device not shown) attached to the revising unit 6 (step 7). In FIG. 7A, "branch art" is specified.

The revising unit 6 refers to the Japanese-document-to-translated-document correspondence table 13 to extract a character from the recognized document that corresponds to the specified portion. As a result, "枝術" ("branch art" in English) is extracted as the corresponding character in the recognized document. Then, the revision unit 6 extracts the corresponding character "技術" ("technological" in English) in the-image-of-the-document using the above position information. The revising unit 6 informs the correspondence table producing and displaying unit 11 of information about these extracted portions (step 8).

As a result, as illustrated in FIG. 7B, the specified portion that seems to have been misrecognized is displayed explicitly by the display unit 7. The explicit display is performed by blinking or reversing (i.e., reversing white and black) corresponding portions in the documents (step 9).

Subsequently, the user makes a comparison between the image-of-the-document and the recognized document to confirm that the recognition result is wrong. Then, the user enters a predetermined command (for example, through a click of the mouse) in step 10. As a result, the revising unit 6 refers to the candidate character making unit 12 extract candidate characters for the misrecognized portion in the recognized document, and informs the document producing unit 11 of these candidate characters (step 11). The candidate characters for the misrecognized portion are thereby displayed on the display unit 7 (step 12).

When, in step 13, the user selects arbitrary characters from among the candidate characters displayed on the display unit 7 through clicks of the mouse as illustrated in FIG. 7C, the misrecognized portion of the recognized document is replaced with the selected candidate characters and the revising unit 6 replaces the corresponding portion in the Japanese document storage unit 5 with the candidate characters (step 14).

The contents of the recognized document which has been subjected to replacement in that way are sent to the translating unit 9. The translating unit 9 retranslates the portion corresponding to the selected candidate characters and sends the newly translated document to the correspondence table producing and displaying unit 11 via the translated document storage unit 10 (step 15).

The correspondence table producing and displaying unit 11 produces a new image-to-character-position-correspondence-table on the basis of the correct translated document sent from the translating unit and displays it as illustrated in FIG. 7D (step 15→step 5). Finally, the user terminates the revision work through a click of the mouse (step 6).

As described above, the user can search a translated document to find misrecognized characters in a recognized document, not a recognized document made by the Japanese document reader. Thus, even foreigners with little knowledge of Japanese can carry out revision work without difficulty.

In addition, the work of revising a recognized document can be carried out not by kana-to kanji conversion using keyboard entry but by selecting a correct character from displayed candidate characters through visual matching with an image-of-a-document. Thus, even persons with little knowledge of Japanese can carry out the revision work with ease.

What is claimed is:

1. A document revising apparatus for use with a document reading and translating system for performing character recognition of an image-of-a-document to produce a recognized document, and for translating the recognized document to produce a translated document, comprising:

character recognition means for entering a document written in a first language as an image-of-a-document, segregating characters from said image-of-a-document and performing character recognition one each segregated character to produce a recognized document;

translating process means for translating said recognized document in said first language to a second language to produce the translated document, and for producing a correspondence relationship between the recognized document and the translated document;

correspondence table producing and displaying means for producing and displaying an image-to-character-position-correspondence-table in which a correspondence is established between said image-of-a-document, said recognized document and said translated document;

original-document-to-translated-document correspondence relationship storing means for storing the correspondence relationship between the recognized document and the translated document, from said translating process means;

candidate character producing means for producing candidate characters used for revising misrecognized characters; and document revising means including means for allowing a user to specify a misrecognized portion in said image to-character-position-correspondence-table displayed by said correspondence table producing and displaying means;

means for referring to said original-document-to-translated-document correspondence relationship storing means to extract portions of said image-of-the-document and said recognized document which correspond to said misrecognized portion specified and causing said correspondence table producing and displaying means to display said extracted portions;

means for referring to said candidate character producing means to extract candidate characters for said misrecognized portion in said recognized document as requested by the user and causing said correspondence table producing and displaying means to display said candidate characters;

means for allowing the user to select arbitrary characters from said candidate characters displayed and replacing said misrecognized portion in said recognized document with selected candidate characters; and means for causing said translating means to retranslate a new document in which said misrecognized portion is replaced with said selected candidate characters to produce a new translated document and causing said correspondence table producing and displaying means to display said new translated document.

2. The document revising apparatus according to claim 1, wherein said character recognition means includes image entry means for entering said document in said first language as an image-of-a-document, image-of-the-document storage means for storing said image-of-the-document, character segmentation means for segregating each character from said stored image-of-the-document, character recognition means for performing character recognition on each of said characters segregated from said image-of-the-document, and document storage means for storing said recognized character as the recognized document.

3. The document revising apparatus according to claim 2, wherein said translation means includes translating means for translating the recognized document into the translated document, and translated document storage means for storing the translated document.

4. The document revising apparatus according to claim 3, wherein said character segmentation means generates position information corresponding to each segregated character, and wherein said correspondence table producing and displaying means reads said image-of-the-document from said image-of-the-document storage means, said recognized document from said document storage means and said translated document from said translated document storage means based on position information read from said character segmentation means, to produce said displayed document.

5. The document revising apparatus according to claim 2, wherein said candidate character producing means refers to said character recognition means to produce said candidate characters.

6. The document revising apparatus according to claim 2, wherein said image entry means includes an optical character reader for entering a document written or printed on a sheet of paper as an image-of-a-document.

7. The document revising apparatus according to claim 1, wherein said original-document-to-translated-document correspondence relationship storage means stores a correspondence relationship between said original document and said translated document in the form of a table.

8. The document revising apparatus according to claim 1, wherein said first language is Japanese.

9. A method for revising a translated document of a first language based on an image-of-a-document and a recognized document of a second language using a document revising system, comprising the steps of:
 a) displaying at least the translated document using a display;
 b) user designating a misrecognized portion of the translated document based on a context of the translated document, using a revising unit;
 c) displaying the misrecognized portion in correspondence with a portion of the recognized document and a portion of the image-of-a-document which corresponds to the misrecognized portion using at least the display and correspondence table producing and displaying unit;
 d) selectively displaying at least one candidate character for the recognized document, corresponding to the misrecognized portion, using at least the display, the correspondence table producing and displaying unit, a candidate character producing unit and the revising unit;
 e) user comparing the at least one candidate character of said sep (d) with a corresponding at least one character in the image-of-a-document;
 f) user selecting the at least one candidate character based on said step (e) to replace the misrecognized portion with the at least one candidate character, using at least a character recognition process unit;
 g) translating the at least one candidate character to modify the misrecognized portion of the translated document, using at least a translating process unit; and
 h) displaying the at least one candidate character in correspondence with a portion of the translated document modified in said step (g) and the portion of the image-of-a-document, using at least the display and the correspondence table producing and displaying unit.

10. A method according to claim 9, further comprising the steps of:
 i) user determining that the portion of the translated document is correct based on the context of the translated document, and
 j) repeating said steps (b)–(i) when said determining of said step (i) establishes that the portion of the translated document is not correct.

11. A method for revising a translated document of a first language based on an image-of-a-document and a recognized document of a second language, comprising the steps of:
 a) displaying at least the translated document;
 b) designating a misrecognized portion of the translated document;
 c) displaying a portion of the image-of-a-document and a portion of the recognized document corresponding to the misrecognized portion;
 d) selectively displaying at least one candidate character corresponding to the portion of the recognized document;
 e) comparing the at least one candidate character with a corresponding at least one character in the image-of-a-document;
 f) selecting the at least one candidate character based on said step (e);
 g) translating the at least one candidate character to modify the translated document; and
 h) displaying at least the translated document modified in said step (g).

12. A method according to claim 11, further comprising the steps of:
 i) determining whether the translated document displayed in said step (h) is correct; and
 j) repeating said steps (b)–(i) when said determining of said step (i) establishes that the translated document modified in said step (g), is not correct.

* * * * *

UNITED STATES PATENT AND TRADEMARK OFFICE
CERTIFICATE OF CORRECTION

PATENT NO. : 5,222,160
DATED : June 22, 1993
INVENTOR(S) : Rieko SAKAI et al.

It is certified that error appears in the above-indentified patent and that said Letters Patent is hereby corrected as shown below:

Title Page, under [57] Abstract, line 16, change "image to character" to

--image-to-character--.

Column 4, line 52, after "Japanese" insert

-- - --.

Column 5, line 51, change the second mention of

"a" to --the--;

line 54, change both mentions of

"a" to --the--.

Column 6, line 4, change "a" to --the--;

Column 7, line 63, after "image" insert -- - --;

UNITED STATES PATENT AND TRADEMARK OFFICE
CERTIFICATE OF CORRECTION

PATENT NO. : 5,222,160

DATED : June 22, 1993

INVENTOR(S) : Rieko Sakai et al

It is certified that error appears in the above-indentified patent and that said Letters Patent is hereby corrected as shown below:

Column 9, line 31, change "sep" to --step--.

Signed and Sealed this

Twenty-ninth Day of March, 1994

*Attest:*

BRUCE LEHMAN

*Attesting Officer*     *Commissioner of Patents and Trademarks*